(12) United States Patent
Naegle

(10) Patent No.: US 7,071,996 B2
(45) Date of Patent: Jul. 4, 2006

(54) SYNCHRONIZING VIDEO FORMATS WITH DISSIMILAR TIMING

(75) Inventor: Nathaniel David Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 552 days.

(21) Appl. No.: 10/200,032

(22) Filed: Jul. 19, 2002

(65) Prior Publication Data

US 2004/0012578 A1 Jan. 22, 2004

(51) Int. Cl.
*H04N 5/262* (2006.01)
*H03L 7/06* (2006.01)

(52) U.S. Cl. ................ 348/500; 327/147

(58) Field of Classification Search ........... 348/500, 348/505, 589, 584, 578, 585, 586; 327/156, 327/159

See application file for complete search history.

(56) References Cited

U.S. PATENT DOCUMENTS

| | | | | |
|---|---|---|---|---|
| 5,051,817 A | * | 9/1991 | Takano | 348/569 |
| 5,072,195 A | * | 12/1991 | Graham et al. | 331/2 |
| 5,734,970 A | * | 3/1998 | Saito | 455/76 |
| 5,801,789 A | * | 9/1998 | Zeidler et al. | 348/589 |
| 5,933,196 A | * | 8/1999 | Hatano et al. | 348/441 |
| 6,188,258 B1 | * | 2/2001 | Nakatani | 327/157 |
| 6,218,876 B1 | * | 4/2001 | Sung et al. | 327/156 |
| 6,310,922 B1 | * | 10/2001 | Canfield et al. | 375/240.28 |
| 6,385,267 B1 | * | 5/2002 | Bowen et al. | 375/376 |
| 6,417,861 B1 | * | 7/2002 | Deering et al. | 345/589 |
| 6,421,496 B1 | * | 7/2002 | Sato | 386/1 |
| 6,441,658 B1 | * | 8/2002 | Taraci et al. | 327/147 |
| 6,525,778 B1 | * | 2/2003 | Suzuki | 348/556 |
| 6,703,876 B1 | * | 3/2004 | Fujiwara et al. | 327/156 |
| 6,704,009 B1 | * | 3/2004 | Tachibana et al. | 345/213 |
| 2002/0033828 A1 | | 3/2002 | Deering et al. | |

OTHER PUBLICATIONS

Dan Strassberg, "Frame Grabbers Get the Picture When Video Cameras Fall Short", Mar. 2, 1998, 5 pages.
Ray Andraka, "A Dynamic Hardware Video Processing Platform", Conference on Reconfigurable Technology for Rapid Product Development and Computing, SPIE Photonics East '96, Nov. 1996, 10 sheets.
PC Video Synchronization and Playback, 3 pages, Dec. 4, 2001.
Video Genlock PLL, 6 pages, May 13, 1997.
DSP56300 Family Manual, Revision 2.0, Chapter 6 titled "PLL and Clock Generator", Publication date no later than the publication date of Rev. 3.0 which is Nov. 2000, 13 pages.
DSP56300 Family Manual, Revision 3.0, Chapter 6 titled "PLL and Clock Generator", Nov. 2000, 13 pages.

* cited by examiner

*Primary Examiner*—Paulos M. Natnael
(74) *Attorney, Agent, or Firm*—Meyertons Hood Kivlin Kowert & Goetzel, P.C.; Jeffrey C. Hood; Martin R. Wojcik

(57) ABSTRACT

In order to synchronize two dissimilar video formats, two or more phase locked loop circuits (PLL's) may be used in tandem. A first PLL circuit may be connected to the first video format (Master) and generate an intermediate frequency. A second PLL circuit may use the intermediate frequency as the timebase for generating the pixel clock for the second video format (Slave). One or more Slaves may be connected to the generated pixel clock. The video synchronizing device may be a part of a graphics system, such as a graphics accelerator.

34 Claims, 3 Drawing Sheets

SYNCHRONIZING VIDEO FORMATS WITH DISSIMILAR TIMING

BACKGROUND OF THE INVENTION

Description of the Related Art

It is often desirable to synchronize several display devices such as monitors or projectors, such that their vertical retrace occurs simultaneously. This would be the case if the display devices were being filmed or videotaped, for example. Since display devices synchronize themselves to the video sources to which they are connected, achieving synchronization of the displays is equivalent to synchronizing their video sources. The video source can be a computer graphics accelerator.

Traditionally synchronizing graphics accelerators is accomplished by means of asynchronous frame reset, where a Frame Reset signal from a first graphics accelerator, designated as a Master, is used to reset the video timing circuits of one or more second graphics accelerators, designated as Slaves. In this simple synchronization technique, known as Framelock, the video timing of the one or more Slaves is asynchronously reset at a set time in the Master's video timing. The Slaves, upon receipt of the Frame Reset signal, reset their vertical counters at the next horizontal line boundary. However, the video timing circuitries of the Master and of the one or more Slaves operate independently, each deriving their respective timebase, from a local crystal oscillator, usually at 13.5 MHz.

The problem with the Framelock synchronization technique is a potential for frequency drift in the independent timebase between the Master and the one or more Slaves, caused by the independent operation of the local timebase crystals. The frequency drift can cause the Frame Reset signal to be received by the Slave at different times during successive frames, potentially on different video scanlines in successive frames. In other words, each of the crystals may have timing variations, or tolerances, which can cause a timebase to be slightly faster or slower then the other(s). These variations can result in dropped video lines if the Master resets a Slave whose video timing has not progressed to the same line as the Master.

The dropped lines can cause problems in display devices connected to the slave machine. Most multisync monitors will blank their screens and attempt to configure their timing to a new video format, which occurs when the multisync monitor detects a change in the total number of lines per frame of input video. As a result, the Framelock synchronization technique may be insufficient to achieve frame synchronization required by many high-end visualization-simulation and scientific visualization applications.

Genlock is a synchronization technique that solves the dropped line problem by effectively eliminating the independent timebases of the Master and of the one or more Slaves. By using Genlock, the Master's video signals are used to generate clock signals in the one or more Slaves by using a phase-locked loop (PLL), whose operation is described below. Genlocking, a technique whereby the Slave's pixel clock is generated by phase-locking to the video synchronization information of the Master, eliminates the need for the Slave's local 13.5 MHz timebase. This prevents any drift arising from independent crystal oscillators. This lack of drift between video formats on the Master and on the one or more Slaves ensures that the one or more Slaves receive the Master Frame Reset signal at the same point on subsequent frame boundaries. In other words, video frames are perfectly synchronized using the Genlock technique.

FIG. 1 illustrates a conventional phase lock loop (PLL) 100, in which phase locking of two signals, an external signal 116 and a local signal 110, takes place. Phase lock loop 100 includes a phase difference detector 102, a loop filter 104, a clock generator 106, which may be a Voltage controlled Oscillator (VCO). The PLL also includes a pre-divider 100 and a feedback frequency divider 108, which actually acts as a frequency multiplier. A PLL may also have a clock generator, such as a crystal (not shown).

Phase difference detector 102 determines the phase difference between local signal 110 and an external signal 116. External signal 116 may be received from an external signal source. If the value of actual phase difference signal is equal to zero, local signal 110 is locked in phase with external signal. If the value of actual phase difference signal is not equal to zero, local signal 110 is not locked in phase with external signal, and the frequency of local signal 110 needs to be corrected in order to affect the phase of local signal 110 relative to external signal 116. Clock generator 106, which may be a voltage controlled oscillator (VCO), creates a local signal 110.

This frequency, in conjunction with an m-over-n frequency multiply/divide, sets the overall target frequency of local clock signal 110. Clock input frequency division is accomplished by means of a frequency predivider 100, also referred to as the N internal divider. The Frequency Divider, also referred to as the M internal feedback multiplier 108, which connects to the feedback loop of the PLL, multiplies the incoming external clock. In the PLL closed loop, the effect of the frequency divider is to multiply the PLL input frequency by its Division Factor.

The problem with the Genlock synchronization technique is that the PLLs used for Genlocking typically require that the video formats of the Master and the one or more Slaves being synchronized are identical. Genlock is almost never an option for synchronizing video formats with the same frame rate and different resolution. This limitation of the Genlock technique is inconvenient when filming computer graphic displays, or when using display devices with dissimilar video timing formats that must be synchronized to prevent crawling bands on the displays. In addition, for operator training simulation, the out-the-window displays need to be synchronized with tactical and instrument displays.

SUMMARY

In order to synchronize two dissimilar video formats, two or more phase locked loop circuits (PLL's) may be used in tandem. A first PLL circuit may be connected to the first video format (Master) and generate an intermediate frequency. A second PLL circuit may use the intermediate frequency as the timebase for generating the pixel clock for the second video format (Slave). One or more Slaves may be connected to the generated pixel clock.

The final frequency $F_{Final}$ of the final signal may be equal to:

$$F_{Final} = \frac{F_1 \times M_1 \times M_2}{N_2},$$

where

F1 is the frequency of the at least a part of the stripped genlock signal, such as Hsync, for example;

M1 is the value of an internal frequency multiplier of the first phase-locked loop circuit;

M2 is the value of an internal frequency multiplier of the second phase-locked loop circuit, which may be implemented by a Video Timing Generator; and N2 is the value of an internal frequency divider of the second phase-locked loop circuit, which may be implemented by a logic circuit.

The video synchronizing device may be a part of a graphics system, such as a graphics accelerator. The graphic system may include one or more filtering units. The one or more filtering units are operable to filter samples and produce pixels. Each one of the one or more filtering units may include one or more video synchronizing devices. The video synchronization device may be used to synchronize a local video signal and an external video signal.

Vertical synchronization may be accomplished by using a Vertical Reset signal, which is not asynchronous since the pixel clock is derived from the timing of the Master. The Frame Reset signal will occur at the same instant in the video frame of the one or more Slaves, and as a result the one or more Slaves will not drop any video lines.

DETAILED DESCRIPTION OF EMBODIMENTS OF THE INVENTION

U.S. patent application Ser. No. 09/894,617, filed on Jun. 27, 2001, entitled "Flexible Video Architecture for Generating Video Streams", invented by Michael F. Deering and Nathaniel D. Naegle, is hereby incorporated by reference in its entirety.

U.S. Pat. No. 6,417,861 filed Jul. 17, 1999, entitled "Graphics system with programmable sample positions", invented by Michael F. Deering and Nathaniel D. Naegle, is hereby incorporated by reference in its entirety.

Various embodiments of a pixel synthesizing device are described below. Various embodiments of the pixel synthesizing device may be included in the various embodiments described in the U.S. patent application Ser. No. 09/894,617. Various embodiments of the pixel synthesizing device may be included in the various embodiments described in the U.S. patent application Ser. No. 09/894,617.

Figure 2:
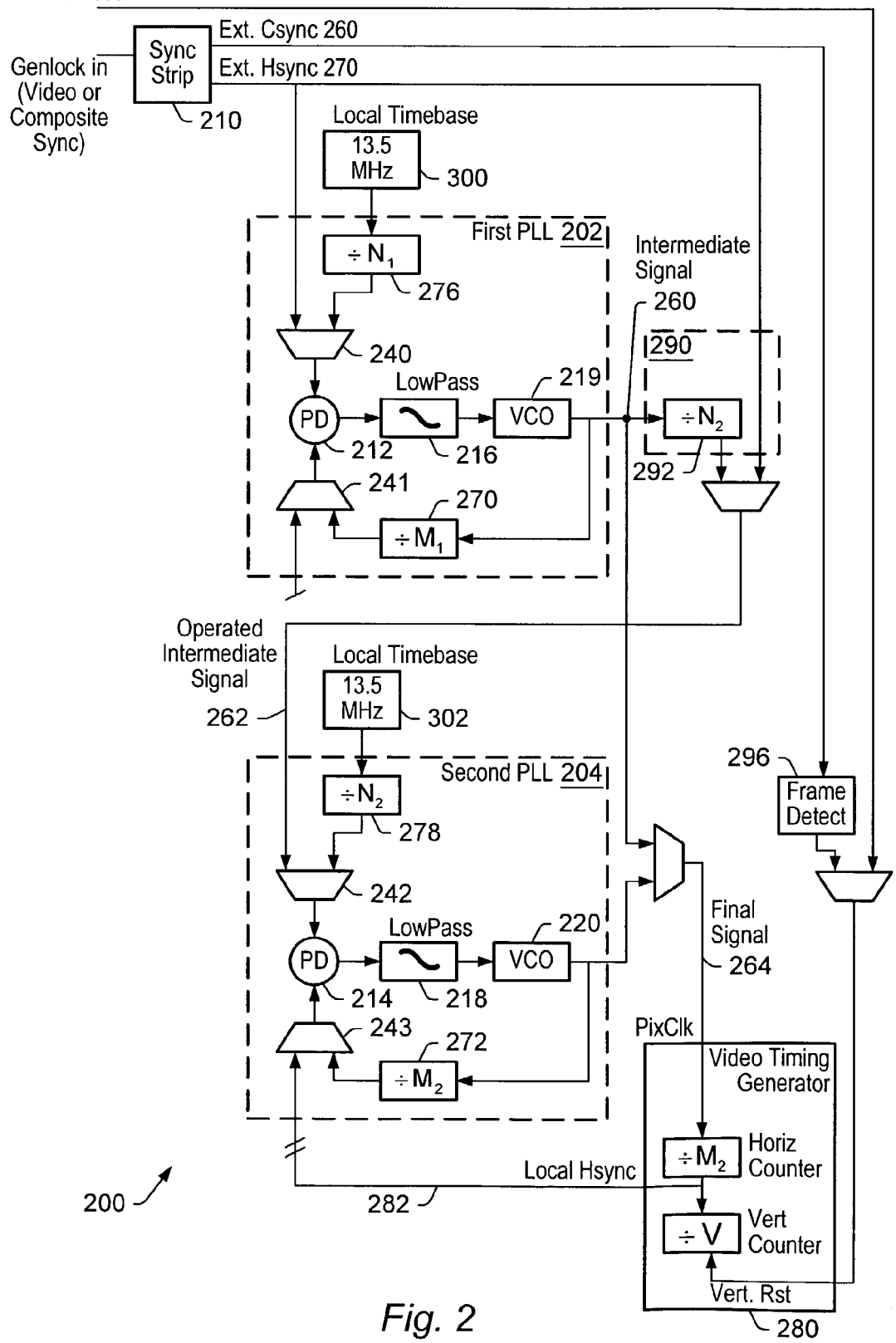
FIG. 2—Basic block diagram of a clock synthesizing device, according to one embodiment.

FIG. 2—Basic Block Diagram of a Video Synchronizing Device

FIG. 2 illustrates a basic block diagram of a video synchronizing device, according to one embodiment.

In one embodiment, the video synchronizing device may be a part of a graphics system, such as a graphics accelerator. The graphic system may include one or more filtering units. The one or more filtering units are operable to filter samples and produce pixels. Each one of the one or more filtering units may include one or more video synchronizing devices. The video synchronization device may be used to synchronize a local video signal and an external video signal.

In one embodiment, the video synchronizing device 200 is operable to synchronize a first video signal 250 having a first video format with a second video signal having a second video format. The first video format may be referred to herein as a Master video signal, and the second video format may be referred to herein as a Slave video signal. Both the first and the second video signals should have the same frame rate. However, the video formats of each of the first and the second video signals may be dissimilar, meaning the video formats can have different resolution.

The video synchronizing device 200 may include a genlock signal input terminal also referred to herein as the synchronization stripper device 210, operable to receive a genlock signal from the first video signal 250, and propagate a stripped genlock signal of a first frequency. The stripped genlock signal may include a Composite Synchronization signal CSync 260 and a Horizontal Synchronization signal HSync 270 for the first video signal 250. In one embodiment, a synchronization stripper device 210 is operable to receive and operate on the at least a part of the first video signal 250, where the first video signal can have a very wide frequency range, such as 15 kHz to 121 kHz. In addition, a Frame Reset signal from the first video signal 250 may be propagated to the video synchronizing device 200.

Figure 1:
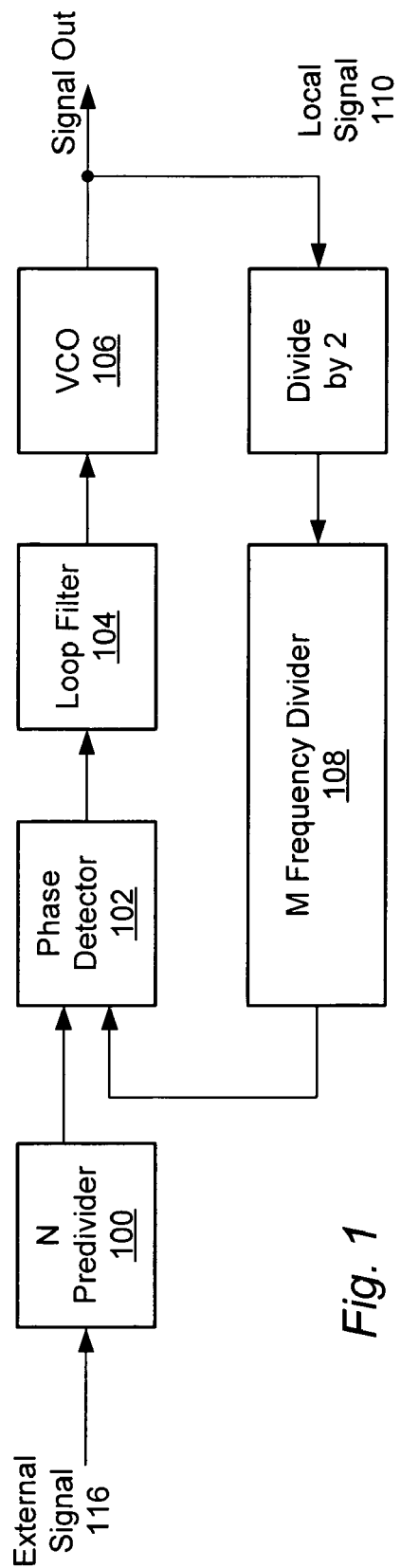
FIG. 1 (Related Art)—Basic block diagram of a PLL.

The video synchronizing device 200 may include a first phase-locked loop circuit (PLL) 202 operable to receive at least a part of the stripped genlock signal, or the HSync 270 signal for the first video signal 250. The basic operation of a PLL is described above with reference to FIG. 1. The first phase-locked loop circuit 202 may produce an intermediate signal 260 of an intermediate frequency. The first phase-locked loop circuit 202 may be operable to multiply the frequency of the at least a part of the stripped genlock signal 270, or the HSync signal for the first video signal, by a first multiplication factor M1 270, also referred to as an internal feedback divider, to produce the intermediate signal 260 of the intermediate frequency.

In one embodiment, the internal frequency divider N1 276 of the first phase-locked loop circuit 202 is not utilized, as the local timebase 300 is not connected through a multiplexer 240. In other words, the Hsync signal from the first video signal 250 is used as a timebase for the first PLL 202. In one embodiment, the first phase-locked loop 202 may be operable to use an internal frequency multiplier M1 270 instead of an input from a Video Timing Generator.

The video synchronizing device 200 may include a second phase-locked loop circuit 204 operable to receive the intermediate signal 260 and produce a final signal 264 of a final frequency. The second phase-locked loop circuit 204 may include a logic circuit 290 operable to operate on the intermediate signal 260 to produce an operated intermediate signal 262. The second phase-locked loop circuit 204 may be operable to divide the frequency of the intermediate signal 260 by a second division factor N2 to produce the operated intermediate signal 262. In one embodiment, the N2 divider implemented by the logic circuit 290 may be operable to function analogously to an internal frequency divider 278 of the second phase-locked loop circuit 204. In one embodiment, the internal frequency divider 278 of the second phase-locked loop circuit 204 is not utilized. In one embodiment, a multiplexer 242 may select the operated intermediate signal 262 from the first PLL 202 as the timebase of the second PLL 204 instead of the local timebase 302.

The second phase-locked loop circuit 204 may be further operable to multiply the frequency of the intermediate signal by a second multiplication factor M2 to produce the final signal 264 of a final frequency. The second phase-locked loop circuit 204 may couple to a video timing generator 280. The video timing generator may be operable to produce a frequency multiplier M2 used by the second phase-locked loop circuit 204. The video timing generator 280 may be operable to produce the frequency multiplier M2 while being synchronized with the second phase-locked circuit 204. In one embodiment, a multiplexer 243 may select the frequency multiplier M2 generated by the VTG 280 instead of the internal frequency multiplier M2 272, which will not be used.

The final frequency $F_{Final}$ of the final signal 264 may be equal to:

$$F_{Final} = \frac{F_1 \times M_1 \times M_2}{N_2},$$

where
- F1 is the frequency of the at least a part of the stripped genlock signal (HSync 270);
- M1 is the value of the internal frequency multiplier 270 of the first phase-locked loop circuit 202;
- M2 is the value of the internal frequency multiplier 272 of the second phase-locked loop circuit 204; and
- N2 is the value of the internal frequency divider 290 of the second phase-locked loop circuit.

In summary, the first PLL circuit 202 may be connected to the first video format (Master) and generate the intermediate frequency 360. The second PLL circuit 204 may use the intermediate frequency as the timebase for generating the pixel clock, or the final signal 264 for the second video format (Slave). One or more Slaves may be connected to the generated pixel clock.

Other embodiments using different internal PLL structures and/or different techniques for routing the signals through the PLL may be contemplated.

Figure 3:
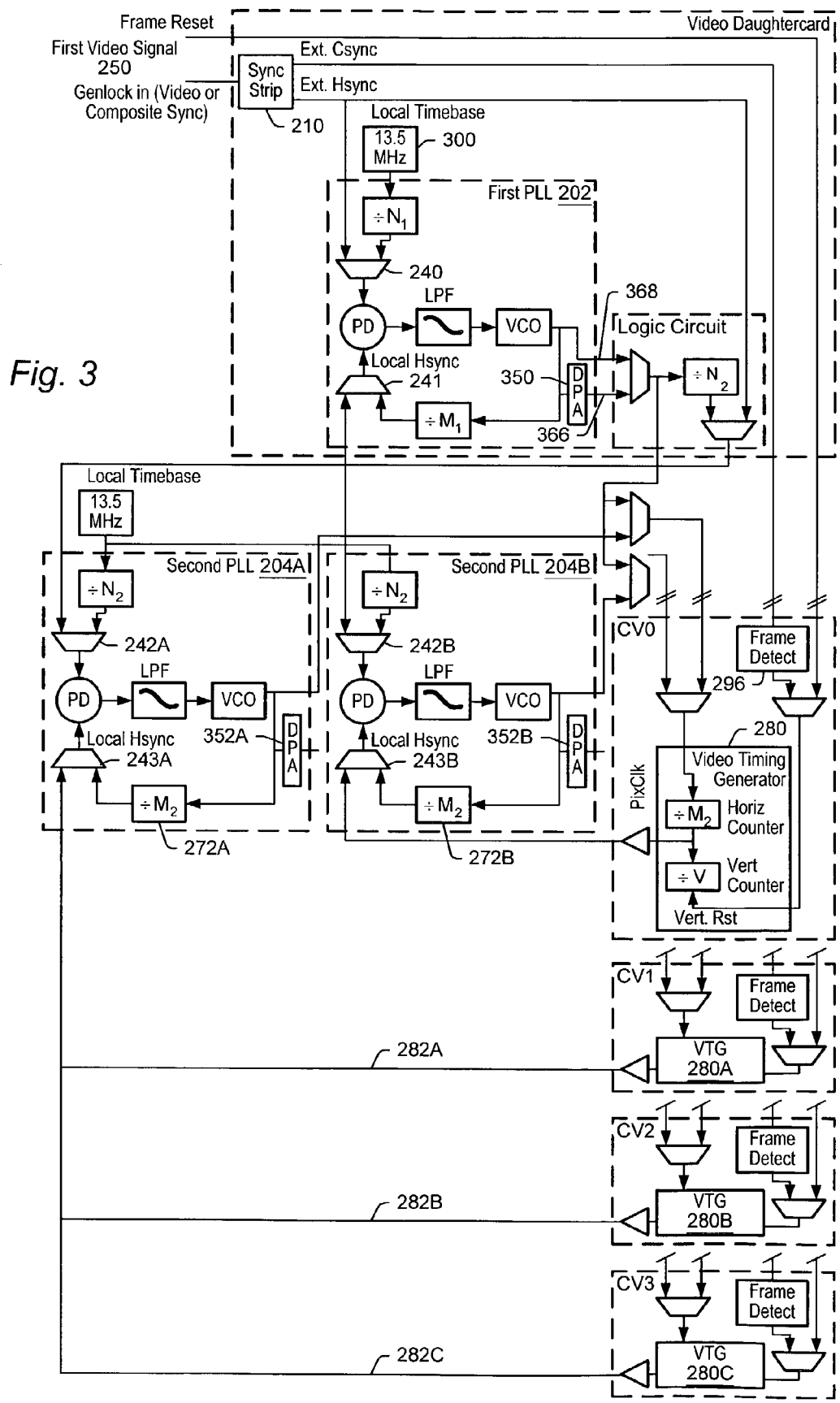
FIG. 3—Detailed block diagram of a clock synthesizing device, according to one embodiment.

FIG. 3—Detailed Block Diagram of a Video Synchronizing Device

FIG. 3 is a detailed block diagram of a Video Synchronizing Device, according to one embodiment. FIG. 3 shows one embodiment of a detailed implementation of the video synchronizing device 200 of FIG. 2. The tandem PLL arrangement allows dissimilar video formats to be synchronized. If the frame rates of the dissimilar video formats are the same, the Frame Reset signal can be used to achieve vertical synchronization once the pixel clock has been synchronized.

In one embodiment, there may be a plurality of VTG's 280, 280A, 280B, and 280C. In one embodiment, there may be one or more second PLL's 204A and 204B. The N2 divider in the logic circuit 290 can be programmed to produce the Hsync signal produced by the Video Timing Generator (VTG) 280 for interlaced video formats. This signal may be passed to the one or more second PLL's 204A and 204B, which can lock and produce the pixel clock. The N2 divider 292 in the logic circuit 290 may be able to be synchronously reset by the incoming Hsync signal, such that the Hsync signal produced by the N2 divider 292 has zero phase with the first video signal 250. This allows the one or more second PLL's 204A and 204B to lock with the Hsync signal from the VTG 280, with either Zero or Hperiod/2 phase with respect to the incoming video timing. The VTG Csync signals can be passed to the logic circuit 290 for a determination of synchronization phase. If the synchronization phase is Hperiod/2, the logic circuit 290 N2 divider can skip clock pulses from the first PLL 202 until the horizontal phase of the VTG 280 is zero with respect to the incoming video timing from the first video signal 250.

In one embodiment, an ability to adjust VTG horizontal phase by means of the N2 divider 292 may be also under user control. System software can adjust the phase of the Hsync produced by the N2 divider 292 to include a selected horizontal phase with respect to the incoming Master video timing from the first video signal 250. In one embodiment, interlaced, progressive, and/or and stereo video formats can be phase adjusted by programming the logic circuit 290 N2 divider to produce a pure Hsync signal, instead of 2×Hsync for interlace formats. The Hsync signal can then be sent to the one or more second PLL's 204A and 204B.

In one embodiment, each PLL may contain a sub-pixel, Dynamic Phase Adjustment (DPA) 350, 352A, and 352B. The DPA clock output may be used on the first PLL 202. The first PLL 202 may have two PECL clock outputs 366 and 368, the first PECL output 366 containing the DPA function, and the second PECL 368 without. The DPA adjustment may be used for pixel clocks below 160 MHz, and the first PECL output 366 should be used. For higher frequency pixel clocks, sub-pixel phase adjustment is not usually necessary, and the non-DPA PECL clock output 368 should be used to ensure good duty-cycle on the PixClk. This is critical for PixClks above 200 MHz. Both of these PECL clock outputs 366 and 368 may be propagated to the logic circuit 290, which may be operable to select one of these clocks.

Selecting the DPA clock output and using the pixel phase adjust feature of the logic circuit 290 N2 divider 292 may give the ability to adjust pixel phase of the Hsync signal sent to the one or more second PLL's 204A and 204B. With the VTG Hsync signal used as the feedback divider 282, 282A, 282B, and 282C for the one or more second PLL's 204A and 204B, the VTG 280 may maintain zero phase with respect to the Hsync signal from the logic circuit 290. Thus the VTG 280 may inherit whatever horizontal phase the N2 divider has with respect to the Master's video timing. Therefore the DPA outputs of the one or more second PLL's 204A and 204B may be unneeded and unused. The VTG Frame Detector may implement vertical phase adjustments. As a result, the video synchronization device may have complete horizontal and subpixel genlock phase adjustment.

For most free-running video formats, using a simple (non-tandem) PLL synthesizer, the pixel clock is a multiple of the local timebase frequency of 13.5 MHz:

$$PixClk = \frac{M}{N} \times 13.5 \text{ MHz}$$

For any video format whose pixel clock was generated from a 13.5 MHz timebase, it's easy to relate the horizontal frequency to the timebase:

$$H_{rate} = \frac{M}{N \times pixClkPerPeriod} \times 13.5 \text{ MHz}$$

Therefore, for most Hsync frequencies at the genlock input, the first PLL 202 can be configured to recover the 13.5 MHz reference frequency of the Master:

$$13.5 \text{ MHz} = \frac{H_{rate} \times N \times ClkPerHperiod}{M}$$

Any common factors of M, N, and PixClksPerHperiod may be eliminated. Once the 13.5 MHz reference has been regenerated on the first PLL 202, it can be used as the timebase for generating the pixel clock of the Slave video format, regardless of whether the video formats are the same, since majority of video formats generate their respective pixel clocks from a common 13.5 MHz reference.

$$PixClk_2 = \frac{H_{rate1} \times N_1 \times PixClkPerPeriod_1 \times M_2}{M_1 \times N_2} = 13.5 \text{ MHz} \times \frac{M_2}{N_2}$$

In the equation above, the subscripts on the variables refer to the video format to which they belong. Each of the variables N1, M2, PixClksPerHperiod1, M1, and N2 should be factored into products of prime factors, and all common factors in the numerator and denominator should be eliminated.

The remaining factors should be assigned to the dividers (N2, M1, M2) available in FIGS. 2 and 3, observing the constraints placed on the feedback dividers of the PLL. An example will illustrate this process. Suppose it is desired to frame-lock a Slave running a video format of 1280×1024@76 hz, to a Master running a video format of 1280×800@76 hz. Consulting the specifications for these formats, we find:

| Video Format | Subscript | M | N | PixClksPerHperiod | PixClk Frequency | Hrate |
|---|---|---|---|---|---|---|
| 1280 × 800 @ 76 Hz | 1 | 45 | 6 | 1570 | 101.250 MHz | 64.4904 KHz |
| 1280 × 1024 @ 76 Hz | 2 | 40 | 4 | 1664 | 135.000 MHz | 81.1298 KHz |

The first PLL 202 may be programmed with an internal divide (M1 multiplier) of 157, producing a clock rate of 10.125 MHz. The N2 divider in the logic circuit 290 may be programmed to a value of 3, producing an intermediate frequency of 3.375 MHz. This is the Hsync input to the second PLL 204A and 204B, which should be between 8.0 KHz and 10.0 MHz. The feedback divider M2 of the second PLL 204A and 204B is 40, producing the desired frequency of 135.000 MHz.

$$13.5 \text{ MHz} = \frac{Hrate_1 \times 6 \times 1570}{45} = \frac{Hrate_1 \times 2 \times 3 \times 2 \times 5 \times 157}{3 \times 3 \times 5} = \frac{Hrate_1 \times 628}{3}$$

$$PixClk_2 = \frac{40}{4} \times 13.5 \text{ MHz} = \frac{Hrate_1 \times 628 \times 40}{3 \times 4} = \frac{Hrate_1 \times 157 \times 40}{3}$$

The limits on feedback divider modulus for the PLL may be as follows, depending on the hardware implementation.

$$8 \leq M \leq 4103$$

The values needed for these moduli in the example above need no modification to fall within the limits shown above.

The internal VCO of the PLL may run at a rate between 100 MHz and 500 MHz. This may be easily accomplished by adjusting the post-scaler divider, if necessary. In the example above, the first PLL 202 may have a post-scaler scale factor of 16, so that its VCO will run at 16×10.125 MHz=162 MHz. For the second PLL 204A and 204B, a post-scale divisor of 2 can be used, so that the VCO runs at 270 MHz.

In the example above, the first PLL 202 and the logic circuit 290 N2 divider 292 produce a signal with $$\frac{157}{3} = 52\frac{1}{3}$$

transitions along each scanline of the incoming video format 290. At every such transition, a second PLL 204A and/or 204B may use a phase detector to make a correction in its VCO's frequency. Moderate values of M1, N1, M2, N2 should result in good PLL transfer gain.

Jitter

To limit Jitter, the feedback divider, also referred to as the internal multiplier, M1 270 of the first PLL 202 should have a larger value than that of the second PLL 204 feedback divider (M2, which may be implemented by the VTG 280). In the example above, M1 was programmed to 157, and M2 to 40. This allows the second PLL 204 to respond faster than the first PLL 202, essentially tracking the first PLL's 202 transients and deviations about its nominal frequency.

In one embodiment, each PLL may include a Phase/Frequency Detector and a corresponding Phase/Frequency Detector Gain register (PFDGain), which may control the closed-loop bandwidth of each PLL. The PFDGain value indicates how much current will be issued by the phase detector in response to a given phase error. The magnitude of this current controls the change in VCO control voltage in response to a phase or frequency error measured by the Phase/Frequency Detector. Intuitively, a smaller value of PFDGain will cause the PLL to take longer to eliminate a phase or frequency difference at the inputs to the PFD. Conversely, a too-large PFDGain value may cause the loop to over-correct for such a phase difference, resulting in ringing in the loop response. Typically the value programmed into the PFDGain register of the second PLL 204 should be equal to or greater than the value programmed into the PFDGain register of the first PLL 202. This may result in a faster response by the second PLL 204 than the first PLL 202, in effect allowing the first PLL 202 to dominate the overall loop characteristics.

Multiple Sync-Slaves

In one embodiment, more than two video synchronizing devices can be genlocked together. In such arrangements, it may be preferable for one system to act as a Master for all others, rather than arranging a Genlock daisy-chain, where system A is the Master for system B, system B is the Master for system C, etc. Such daisy-chain effectively puts the PLLs of these systems in tandem, which usually increases clock jitter down the daisy-chain. If necessary, a distribution amplifier may be used to obtain the needed copies of the Master's genlock signal. For two or three Slaves, a BNC T connector may be used to connect the genlock inputs of the Slaves to the Master's video signal.

Other embodiments using different internal PLL structures and/or different techniques for routing the signals through the PLL may be contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A video synchronizing device, wherein the video synchronizing device is operable to synchronize a first video signal having a first video format and a second video signal having a second video format, both video signals having the same frame rate, the video synchronizing device comprising:
   a genlock signal input terminal operable to receive a genlock signal from the first video signal, and propagate a stripped genlock signal of a first frequency;
   a first phase-locked loop circuit operable to receive at least a part of the stripped genlock signal and produce an intermediate signal of an intermediate frequency; and
   a second phase-locked loop circuit operable to receive the intermediate signal and produce a final signal of a final frequency;
   wherein the first video signal is synchronized with video frame timing of the second video signal; and
   wherein one or more of the first-phase locked loop and the second phase locked loop are operable to adjust the phase of the intermediate signal with respect to the genlock signal.

2. The video synchronizing device of claim 1, wherein the second phase-locked loop comprises a logic circuit operable to operate on the intermediate signal to produce an operated intermediate signal, wherein said second phase-locked loop circuit receiving the intermediate signal comprises the second phase-locked loop circuit receiving the operated intermediate signal.

3. The video synchronizing device of claim 1, wherein the stripped genlock signal of a first frequency comprises a composite synchronization signal CSync and a horizontal synchronization signal HSync, wherein the genlock signal comprises one of the CSync and the HSync signal.

4. The video synchronizing device of claim 1, wherein the first phase-locked loop circuit is operable to divide the frequency of the at least a part of the stripped genlock signal by a first division factor to produce the intermediate signal of the intermediate frequency.

5. The video synchronizing device of claim 1, wherein the second phase-locked loop circuit is operable to divide the frequency of the intermediate signal by a second division factor; and
   wherein the second phase-locked loop circuit is further operable to multiply the frequency of the intermediate signal by a second multiplication factor to produce the final signal of a final frequency.

6. The video synchronizing device of claim 5,
   wherein the second phase-locked loop circuit comprises a logic circuit;
   wherein the logic circuit is operable to divide the frequency of the intermediate signal by a second division factor prior to passing the divided intermediate signal to the second phase-locked loop circuit.

7. The video synchronizing device of claim 6, wherein the logic circuit is operable to function analogously to an internal frequency divider of the second phase-locked loop circuit.

8. The video synchronizing device of claim 7, wherein the internal frequency divider of the second phase-locked loop circuit is not utilized.

9. The video synchronizing device of claim 1, wherein the first phase-locked loop circuit is operable to use an internal frequency multiplier.

10. The video synchronizing device of claim 1, further comprising a video timing generator;
    wherein the video timing generator is operable to produce a frequency multiplier used by the second phase-locked loop circuit.

11. The video synchronizing device of claim 10, wherein the video timing generator is operable to produce the frequency multiplier while being synchronized with the second phase-locked circuit.

12. The video synchronizing device of claim 1, wherein the final frequency of the final signal is substantially equal to:

$$F_{Final} = \frac{F_1 \times M_1 \times M_2}{N_2};$$

wherein F1 is the frequency of the at least a part of the stripped genlock signal;
wherein M1 is the value of an internal frequency multiplier of the first phase-locked loop circuit;
wherein M2 is the value of an internal frequency multiplier of the second phase-locked loop circuit;
wherein N2 is the value of an internal frequency divider of the second phase-locked loop circuit, and
wherein $F_{Final}$ is the final frequency of the final signal.

13. The video synchronizing device of claim 1, further comprising: a frame reset input terminal operable to receive a frame reset signal from the first video signal.

14. The video synchronizing device of claim 1, wherein the final signal of final frequency is operable to be used as a pixel clock for the second video signal.

15. The video synchronizing device of claim 1, wherein video frame timing information comprises signals describing one or more of a start, finish, frame rate, and pixel rate of video frames in the video signal.

16. The video synchronizing device of claim 1,
    wherein a video frame comprises one or more synchronization signals, wherein the one or more synchronization signals comprise one or more of a frame reset signal, a vertical synchronization signal, and a horizontal synchronization signal, wherein the one or more synchronization signals describe timing and frame information; and wherein the video synchronizing device is operable to use the one or more synchronization signals to synchronize video frames during the video genlock operation.

17. The video synchronizing device of claim 1, wherein one or more of the first video signal and the second video signal is an analog video signal, wherein the analog video signal comprises one or more synchronization signals that describe timing and frame information.

18. The video synchronizing device of claim 1,
wherein each of the first video signal and the second video signal comprises a frame rate and pixel rate;
wherein frame rate of the first video signal and the second video signal is substantially the same; and
wherein pixel clock of the first video signal is different from the pixel clock of the second video signal.

19. A method to synchronize two video signals, wherein a first video signal has a first video format and a second video signal has a second video format, both video signals have the same frame rate, the method comprising:
receiving a genlock signal from the first video signal;
stripping the genlock signal in order to propagate a stripped genlock signal of a first frequency;
a first phase-locked loop circuit receiving at least a part of the stripped genlock signal and producing an intermediate signal of an intermediate frequency; and
a second phase-locked loop circuit receiving the intermediate signal and producing a final signal of a final frequency;
wherein the first phase-locked loop and the second phase-locked loop are coupled together;
wherein the first video signal is synchronized with video frame timing of the second video signal;
wherein the final frequency of the final signal is substantially equal to:

$$F_{Final} = \frac{F_1 \times M_1 \times M_2}{N_2};$$

wherein F1 is the frequency of the at least a part of the stripped genlock signal;
wherein M1 is the value of an internal frequency multiplier of the first phase-locked loop circuit;
wherein M2 is the value of an internal frequency multiplier of the second phase-locked loop circuit;
wherein N2 is the value of an internal frequency divider of the second phase-locked loop circuit, and
wherein $F_{Final}$ is the final frequency of the final signal.

20. The method of claim 19, wherein the final signal of final frequency is operable to be used as a pixel clock for the second video signal.

21. A graphics system, comprising:
one or more filtering units, wherein the one or more filtering units are operable to filter samples and thereby produce pixels, wherein each one of the one or more filtering units comprises one or more video synchronizing devices, wherein the one or more video synchronizing devices are operable to synchronize two video signals with different formats;
wherein each one of one or more video synchronizing devices is operable to synchronize a first video signal having a first video format and a second video signal having a second video format, both video signals having the same frame rate, the video synchronizing device comprising:
a genlock signal input terminal operable to receive a genlock signal from the first video signal, and propagate a stripped genlock signal of a first frequency;
a first phase-locked loop circuit operable to receive at least a part of the stripped genlock signal and produce an intermediate signal of an intermediate frequency; and
a second phase-locked loop circuit operable to receive the intermediate signal and produce a final signal of a final frequency; and
wherein the first video signal is synchronized with video frame timing of the second video signal.

22. The graphics system of claim 21, wherein the final frequency of the final signal is substantially equal to:

$$F_{Final} = \frac{F_1 \times M_1 \times M_2}{N_2};$$

wherein F1 is the frequency of the at least a part of the stripped genlock signal;
wherein M1 is the value of an internal frequency multiplier of the first phase-locked loop circuit;
wherein M2 is the value of an internal frequency multiplier of the second phase-locked loop circuit;
wherein N2 is the value of an internal frequency divider of the second phase-locked loop circuit, and
wherein $F_{Final}$ is the final frequency of the final signal.

23. The graphics system of claim 21, wherein the final signal of final frequency is operable to be used as a pixel clock for the second video signal.

24. A video synchronizing device, wherein the video synchronizing device is operable to synchronize a first video signal having a first video format and a second video signal having a second video format, both video signals having the same frame rate, the video synchronizing device comprising:
a genlock signal input terminal operable to receive a genlock signal from the first video signal, and propagate a stripped genlock signal of a first frequency;
a first phase-locked loop circuit operable to receive at least a part of the stripped genlock signal and produce an intermediate signal of an intermediate frequency; and
two or more second phase-locked loop circuits operable to receive the operated intermediate signal and produce a final signal of a final frequency, wherein the two or more second phase-locked loop circuits are operable to synchronize the first video signal with the second video signal using video synchronization signals;
wherein the final frequency of the final signal is substantially equal to:

$$F_{Final} = \frac{F_1 \times M_1 \times M_2}{N_2};$$

wherein F1 is the frequency of the at least a part of the stripped genlock signal;
wherein M1 is the value of an internal frequency multiplier of the first phase-locked loop circuit;

wherein M2 is the value of an internal frequency multiplier of the second phase-locked loop circuit:

wherein N2 is the value of an internal frequency divider of the second phase-locked loop circuit, and wherein $F_{Final}$ is the final frequency of the final signal.

25. The video synchronizing device of claim 24, further comprising a video timing generator;

wherein the video timing generator is operable to produce a frequency multiplier used by the second phase-locked loop circuit; and wherein the video timing generator is operable to produce the frequency multiplier while being synchronized with the second phase-locked circuit.

26. The video synchronizing device of claim 24, wherein the synchronization video signals comprise one or more of a frame reset signal, a vertical synchronization signal, and a horizontal synchronization signal, wherein the synchronization video signals describe timing and frame information;

wherein the video synchronizing device is operable to use the video synchronization signals to synchronize video frames during the video genlock operation.

27. A video synchronizing device, wherein the video synchronizing device is operable to synchronize a first video signal having a first video format and a second video signal having a second video format, both video signals having a same frame rate, the video synchronizing device comprising:

a genlock signal input terminal operable to receive a genlock signal from the first video signal, and propagate a stripped genlock signal of a first frequency;

a first phase-locked loop circuit operable to receive at least a part of the stripped genlock signal and produce an intermediate signal of an intermediate frequency; and a second phase-locked loop circuit operable to receive the intermediate signal and produce a final signal of a final frequency, wherein the second phase-locked loop circuit is operable to synchronize the first video signal with the second video signal;

wherein the intermediate signal has a selected phase difference with the genlock signal.

28. The video synchronizing device of claim 27, further comprising a video timing generator;

wherein the video timing generator is operable to produce a frequency multiplier used by the second phase-locked loop circuit; and wherein the video timing generator is operable to produce the frequency multiplier while being synchronized with the second phase-locked circuit.

29. The video synchronizing device of claim 27, wherein a video frame comprises one or more synchronization signals, wherein the one or more synchronization signals comprise one or more of a frame reset signal, a vertical synchronization signal, and a horizontal synchronization signal, wherein the one or more synchronization signals describe timing and frame information;

wherein the video synchronizing device is operable to use the one or more synchronization signals to synchronize video frames during the video genlock operation.

30. The video synchronizing device of claim 27, wherein the final frequency of the final signal is substantially equal to:

$$F_{Final} = \frac{F_1 \times M_1 \times M_2}{N_2};$$

wherein F1 is the frequency of the at least a part of the stripped genlock signal;

wherein M1 is the value of an internal frequency multiplier of the first phase-locked loop circuit;

wherein M2 is the value of an internal frequency multiplier of the second phase-locked loop circuit;

wherein N2 is the value of an internal frequency divider of the second phase-locked loop circuit, and wherein $F_{Final}$ is the final frequency of the final signal.

31. A video synchronizing device, wherein the video synchronizing device is operable to synchronize a first video signal having a first video format and a second video signal having a second video format, both video signals having the same frame rate, the video synchronizing device comprising:

a genlock signal input terminal operable to receive a genlock signal from the first video signal, and propagate a stripped genlock signal of a first frequency;

a first phase-locked loop circuit operable to receive at least a part of the stripped genlock signal and produce an intermediate signal of an intermediate frequency; and a second phase-locked loop circuit operable to receive the intermediate signal and produce a final signal of a final frequency;

wherein the final frequency of the final signal is substantially equal to:

$$F_{Final} = \frac{F_1 \times M_1 \times M_2}{N_2};$$

wherein F1 is the frequency of the at least a part of the stripped genlock signal;

wherein M1 is the value of an internal frequency multiplier of the first phase-locked loop circuit;

wherein M2 is the value of an internal frequency multiplier of the second phase-locked loop circuit;

wherein N2 is the value of an internal frequency divider of the second phase-locked loop circuit, and wherein $F_{Final}$ is the final frequency of the final signal.

32. The video synchronizing device of claim 31, further comprising a video timing generator;

wherein the video timing generator is operable to produce a frequency multiplier used by the second phase-locked loop circuit; and wherein the video timing generator is operable to produce the frequency multiplier while being synchronized with the second phase-locked circuit.

33. The video synchronizing device of claim 31, wherein the first video signal is synchronized with video frame timing of the second video signal.

34. The video synchronizing device of claim 31, wherein a video frame comprises one or more synchronization signals, wherein the one or more synchronization signals comprise one or more of a frame reset signal, a vertical synchronization signal, and a horizontal synchronization signal, wherein the one or more synchronization signals describe timing and frame information; and wherein the video synchronizing device is operable to use the one or more synchronization signals to synchronize video frames during the video genlock operation.

* * * * *